Feb. 11, 1958 E. KEONJIAN 2,823,312

SEMICONDUCTOR NETWORK

Filed Jan. 26, 1955

INVENTOR:
EDWARD KEONJIAN,
BY George V. Eltgroth
HIS ATTORNEY.

United States Patent Office 2,823,312

Patented Feb. 11, 1958

2,823,312

SEMICONDUCTOR NETWORK

Edward Keonjian, Syracuse, N. Y., assignor to General Electric Company, a corporation of New York Application January 26, 1955, Serial No. 484,237

6 Claims. (Cl. 250—36)

Figure 1:
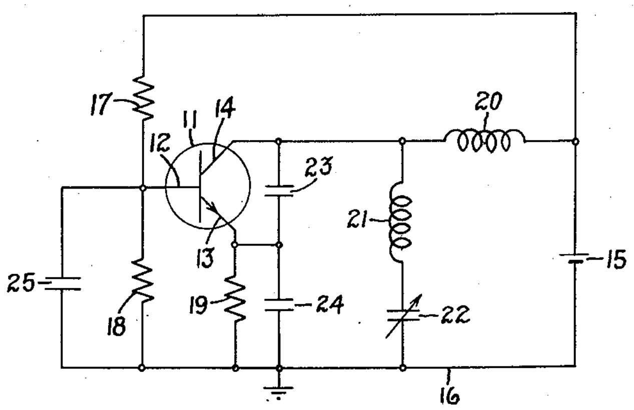

This invention relates to semiconductor networks and more particularly to active semiconductor networks having frequency characteristics which are stabilized against variations caused by ambient temperature changes.

The semiconductor networks here treated find application in oscillator circuits, in tuned radio frequency amplifiers, and in general, in circuits having critical frequency characteristics. Typically, the measures proposed are applicable to transistor circuits in which the transistor electrodes are intimately associated with the frequency determining reactances of the circuit. In such circuits, changes in the impedances of the transistor with variations in ambient temperature are observed to cause substantial disturbances in the resultant frequency properties of the circuit.

Substantially all of the resistive and reactive parameters of a transistor, in uncompensated operating circuits, are subject to some change with temperature, and the effects of each may contribute to variations in the frequency of operation of the complete network. Practically, however, the effects of temperature on certain parameters cause greater frequency changes than the temperature effects on others. In general, the emitter-base diffusion capacity is highly sensitive to temperature changes while the collector-base barrier capacity is relatively insensitive to temperature changes. Likewise, each of the resistive parameters of the transistor is affected by temperature. Using the "T" equivalent circuit definitions for transistor resistances, the transistors currently in use exhibit collector resistances which drop rapidly with increasing temperature and base resistances which may either increase or decrease with increasing temperature. The emitter resistance is usually less temperature sensitive. These temperature characteristics are subject to considerable variation from one kind of transistor to another. Their effects on the frequency of a Colpitts type oscillator are discussed in the Proceedings of the IRE, of August 1954, in an article entitled "Analysis of junction transistor audio oscillator circuits," by J. B. Oakes.

The cumulative result of these temperature caused changes in reactance and resistance are usually such as to cause substantial shifts in the frequency of the network when the temperature is changed. The emitter-base diffusion capacity may be several thousand micromicrofarads for medium frequency transistors. When the temperature changes by 40° C., the diffusion capacity, which is inversely proportional to the absolute temperature, will be reduced by 10%, if the emitter current is held constant. Since the emitter-base diffusion capacity may be either directly applied across an associated frequency determining resonant circuit, or indirectly applied by virtue of coupling internal to the semiconductor, these changes in the emitter-base diffusion capacity can cause relatively large changes in the network frequency characteristics. Likewise, the net effect of the transistor resistances on the operating frequency may be substantial. Certain of the resistances may change several times within a temperature range of 40° C. in a circuit in which they may account for up to 10% of the quantity which fixes the resonant frequency of the overall network. Employing a typical junction transistor, connected in a modified Colpitts oscillator circuit, the circuit permitting some increase in emitter current, the net temperature effect of the transistor on the frequency of operation of this oscillator was to decrease the resonant frequency approximately 0.2% in a temperature range of 35° C. It is an object of the present invention to compensate for such changes in impedances and to stabilize the tuned frequency of such semiconductor circuits.

It is another object of the present invention to provide a new and improved tuned semiconductor network in which the tuned frequency is independent of the ambient temperature effects on the transistor.

It is a further object of the present invention to provide an improved semiconductor oscillator whose frequency is stabilized in the presence of temperature changes.

It is still another object of the present invention to provide an improved tuned amplifier in which the tuned frequency is independent of ambient temperatures.

These and other objects and advantages of the invention are achieved by employing with a semiconductor device a novel direct current energization circuit. The novel energization circuit provides compensation against the changes in the network frequency caused by variations in ambient temperature by introducing compensatory changes in certain parameters of the transistor to restore the network to the desired frequency. In accordance with the invention, it has been determined that certain transistor parameters, which can vary the network frequency, are particularly sensitive to the voltage and current supply conditions. Accordingly, temperature sensitive resistances are connected into the energization circuit to change the operating environment of the transistor when the temperature changes and thus exert a corrective effect on the network frequency by readjusting these sensitive parameters.

Figure 2:
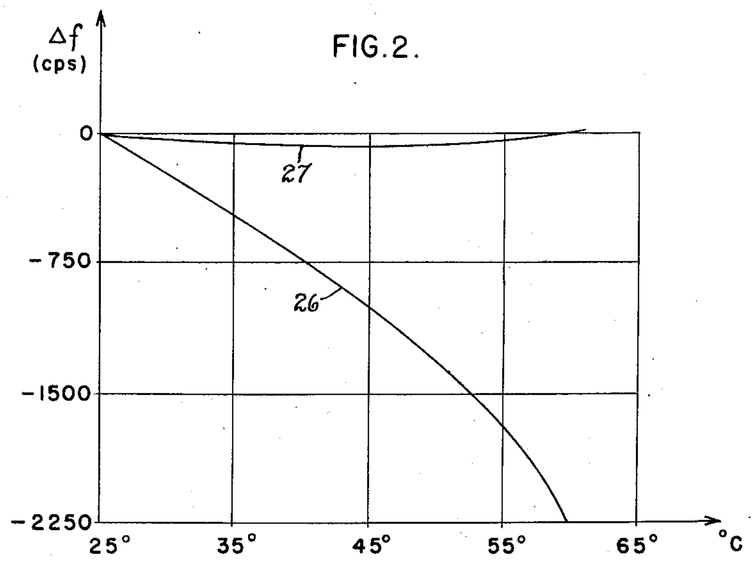

Particular embodiments of the invention employ temperature sensitive resistances connected either to the base electrode or to the emitter electrode adapted to readjust the emitter current and base to collector potentials of the transistor so as to stabilize the transistor network frequency. The manner in which stabilization is achieved will become apparent from a study of the following specification when read in conjunction with the following figures wherein:

Fig. 1 illustrates an oscillator employing a temperature sensitive resistance connected to the base electrode of a transistor oscillator; and Fig. 2 is an explanatory graph illustrating the nature of the compensation achieved in the embodiment shown in Fig. 1.

An oscillator embodying the invention is shown in Fig. 1. It comprises a junction type transistor 11 of the NPN type having a base electrode 12, an emitter electrode 13, and a collector electrode 14. The direct current potentials are supplied to the transistor 11 from a source 15 of direct potentials having its negative terminal connected to a bus 16. The base electrode 12 is energized through a voltage divider comprising resistances 17 and 18. The resistance 17 is connected between the positive terminal of the source 15 and the base electrode 12. The resistance 18 is connected between the base electrode 12 and the bus 16. Energization of the emitter electrode is provided through a path including resistance 19 which is connected between the emitter electrode 13 and the bus 16. The nature of resistances 17 and 18 will be discussed in greater detail below since they enter into the novel compensation circuit. The collector electrode 14 is connected through an alternating current isolating inductance 20 to the positive terminal of the source 15.

The oscillator is connected in a modified Colpitts oscillator circuit. The tank circuit comprises inductance 21 and capacitances 22, 23 and 24. The inductance 21 is connected between the collector electrode 14 and one terminal of a variable tuning capacitance 22, the other terminal of capacitance 22 being connected to the bus 16. The capacitor 23 is connected between the collector electrode 14 and the emitter electrode 13. The capacitor 24 is connected between the emitter electrode 13 and the bus 16. A capacitor 25 is connected between the base electrode 12 and the bus 16. It has a large value so as to present a low impedance path to waves of operating frequency. The inductance 21 and associated capacitances 22, 23 and 24 connected to the electrodes of transistor 11, form a parallel resonant tuned circuit which approximately determines the oscillating frequency. Feedback for sustaining oscillation is provided by separate connection of the base, emitter and collector electrodes into the tank circuit. Positive feedback of current fed into the tank circuit from the collector is provided by shunting a portion of the tank circuit by the base-emitter junction. This junction is poled so that increases in collector current passing through the tuned circuit augment the current through the base-emitter junction to further enhance the collector current and sustain oscillation.

Fig. 2 is a graph illustrating the improvement in frequency stability, achieved through practice of the present invention. The line 26 illustrates the observed decrease in frequency with temperature, if resistances 17 and 18 are non-temperature sensitive. It may be seen that in the oscillator considered, which was operating at a frequency of 1.5 megacycles, that an increase in temperature from 25° C. to approximately 60° C. brought about a decrease in frequency of approximately 2.250 kilocycles. When one employs for resistance 18, a negative temperature co-efficient resistor of the optimum value, the change of frequency with respect to temperature is greatly diminished. The curve 27 illustrates the nature of the compensation effected in the embodiment shown in Fig. 1. It is seen that the frequency stability is greatly increased. If the temperature coefficient of resistance 18 is chosen such that at 25° C. and at 60° C. the compensation is perfect, the improvement is approximately twenty fold at the intermediate temperature of 45° C. More complicated shaping networks can, of course, further improve the compensation throughout this temperature range.

The unusual property of the frequency compensating circuit so far described is that frequency stabilization is effected by circuit elements which are of a non-reactive nature and whose immediate circuit effect is upon the direct current operating points of the transistor. In readjusting the frequency, the base to collector voltage was reduced approximately 0.7 volt from approximately 10 volts. At the same time, the collector current, and likewise the emitter current, which is nearly the same, was reduced from a value of 1.05 milliamperes to 0.9 milliampere. Both changes were brought about by use of the simple negative temperature coefficient resistor 18 connected in the base energization circuit.

The manner in which frequency correction occurs may be explained by consideration of two fundamental transistor properties; the base-collector barrier capacity and the emitter-base diffusion capacity. A discussion of the base-collector barrier capacity has been set forth in the Physical Review of May 1953, entitled "Impurity diffusion and space charge layers in 'fused-impurity' PN junctions," by John S. Saby. The barrier capacity is primarily a function of the voltage occurring across the collector-base barrier, and the nature of the material on either side of the barrier. In general, it is observed that an increase in the voltage across the barrier brings about a decrease in the effective barrier capacity. This is explained by assuming that the number of donors and acceptors in each lattice layer parallel to the barrier is in fact limited. At low potentials, the charges stored at the barrier occupy the pair of lattice-layers immediately adjacent the barrier. When the potentials are increased, since the closest pair of lattice layers are already occupied, lattice-layers which are further separated are occupied, thus causing the centers of charge on either side of the barrier to be separated by greater distances. Since the charge centers are further apart, the effective capacity is reduced. The doping on either side of the barrier, since it controls the density of donors or acceptors in the lattice-layers also regulates the rate at which the capacity varies. In general, it has been observed that the collector barrier capacity varies inversely as the square root of the potential applied. In conventional transistors, the capacity varies through a range of from 5 to 50 micromicrofarads at normal operating potentials. To evaluate the effectiveness of this control, it may be noted that a reduction in the potential across the collector barrier by 10% will reduce the barrier capacity by approximately 5%. If the total resonating capacity is five times the collector barrier capacity, the frequency may be shifted 0.5%. The advantage of employing this type of compensation lies in the fact that adjustment of this characteristic requires relatively little energy dissipation especially in transistors having alphas near unity, and that the magnitude of the correction usually required is usually low enough so as to have no appreciable disturbance on the transistor gain.

The properties of the emitter diffusion capacity are described in an article occurring in the Proceedings of the IRE of February 1954 entitled "A PNP triode alloy-junction transistor for radio frequency amplification," by C. W. Mueller and J. I. Pankove. It may be seen that the diffusion capacity is that capacity observed at the emitter-base junction which is variant with temperature or operating point. It may be treated as arising from the fact that electrical fields are very weak throughout the environment of the emitter-base junction so that carriers emitted into the base are propelled along by their own density gradient. If the carriers are injected rapidly, they tend to bunch up and increase the apparent barrier capacity. If the temperature is high, their kinetic energies are higher and the charges tend to diffuse more rapidly, tending to decrease the apparent barrier capacity. Network frequency correction in the illustrated embodiment of the invention is partially achieved by controllably changing the emitter current so as to vary the diffusion capacity. Since the diffusion capacity is large, it may have a substantial effect on any associated tuned circuit. An emitter current change of 20% will thus occasion a change of 20% in the diffusion capacity. If the diffusion capacity appears in a circuit of the sort illustrated in Fig. 1, assuming an additional shunting capacitance 24 of like value, the net change in capacitance between the emitter electrode and bus 16 is 10%, and in the total resonating capacitance a change of 0.25%, assuming that the capacity shunting the collector barrier is 1/40 as large as the total capacity at the emitter junction. The net effect on the resonating frequency is 0.125%. It may thus be seen that both the diffusion capacity and the collector barrier capacity are controlled by varying the single resistance 18 and that both effects provide frequency compensation in the same direction.

While the invention should not be considered as limited thereto, certain circuit values have been found to give effective stabilization. There is no assertion that these are optimum values, but it is intended that they should serve to demonstrate an operating point for the transistor so that the transistor parameters which compensate for changes in the oscillator frequency may be subject to practical control:

Transistor 11—An NPN type junction transistor having an alpha of approximately 0.98, a cutoff frequency of approximately 5 megacycles, and adapted to provide relatively linear operation to collector currents from one to ten mils.

Source 15—Twelve volts.
Resistance 17—50,000 ohms.
Resistance 18—A compensating network comprising a fixed resistance of 4,000 ohms in series with a temperature sensitive resistance having a value of 6,000 ohms at 25° C. and a negative temperature coefficient of approximately 2% per degree centigrade.
Resistance 19—2,000 ohms.
Inductance 20—40 millihenrys.
Inductance 21—80 microhenrys.
Capacitance 22—100 micromicrofarads.
Inductance 23—500 micromicrofarads.
Capacitance 24—1,000 micromicrofarads.
Capacitance 25—.01 microfarad.

The invention is particularly applicable with those amplifying semiconductor devices in which the emitter diffusion capacity and collector barrier capacity appreciably affect operation in their associated networks.

The invention is further applicable to the situation in which the temperature properties of the transistor cause the network frequency to rise with increasing temperature. In such a case the resistance 17 may be chosen to have a negative temperature coefficient. In this arrangement, it is seen that both the emitter current and the collector-base potential may likewise be simultaneously controlled in a direction to contribute to the stabilizing action by a single temperature sensitive resistor connected to the base electrode.

The invention is also applicable to tuned amplifier circuits wherein the transistor is associated with tuned tank circuits.

While in accordance with the patent statutes, the invention has been described in a particular embodiment, it should of course be understood that the embodiment shown is merely illustrative and that the invention is not limited thereto, since alterations and modifications will readily suggest themselves to persons skilled in the art without departing from the true spirit of the invention or the scope of the annexed claims.

What I claim as new and desire to secure by Letters Patent of the United States is:

1. A semiconductor network tuned to a predetermined frequency comprising a junction semiconductor device whose impedances are affected by ambient temperature and the energization thereof, said semiconductor device having base, emitter and collector electrodes, a tuned circuit coupled between two of said electrodes, a source of energizing potentials and a frequency stabilization circuit comprising an ambient temperature sensitive voltage divider having end terminals connected to the respective terminals of said source and an intermediate terminal connected to said base electrode, at least one leg of said voltage divider comprising an ambient temperature sensitive element, said temperature sensitive element adjusting the energization of said semiconductor device to reduce ambient temperature induced changes in network frequency.

2. A semiconductor network tuned to a predetermined frequency comprising a semiconductor device whose impedances are affected by the ambient temperature and the energization thereof, said semiconductor device having base, emitter and collector electrodes, a tuned circuit coupled between the collector electrode and one of said first recited electrodes, a source of energizing potentials and a frequency compensation circuit comprising an ambient temperature sensitive voltage divider, having end terminals connected to the respective terminals of said source and an intermediate terminal connected to said base electrode, at least one leg of said voltage divider comprising an ambient temperature sensitive element for adjusting the base potential to simultaneously increase the emitter to base junction capacity and the collector barrier capacity in the presence of increases in ambient temperature.

3. A semiconductor network tuned to a predetermined frequency comprising a semiconductor device whose impedances are affected by the ambient temperature and the energization thereof, said semiconductor device having base, emitter and collector electrodes, a tuned circuit coupled to the collector electrode and one of said first recited electrodes, a source of energizing potentials and a frequency compensation circuit comprising a voltage divider, which has one ambient temperature sensitive leg, having its end terminals connected to the respective terminals of said source and its intermediate terminal connected to said base, said temperature sensitive leg adjusting the energization of said semiconductor device to simultaneously change the emitter junction capacity and the collector barrier capacity in the same sense to reduce ambient temperature induced changes in network frequency.

4. A semiconductor network tuned to a predetermined frequency comprising a semiconductor device whose impedances are affected by the ambient temperature and the energization thereof, said semiconductor device having base, emitter and collector electrodes, a tuned circuit coupled to the collector electrode and one of said first recited electrodes, a source of energizing potentials and a frequency compensation circuit comprising a voltage divider which has one ambient temperature sensitive leg, having its end terminals connected to the respective terminals of said source and its intermediate terminal connected to said base, said temperature sensitive leg simultaneously increasing the emitter current and decreasing the base-collector potential to reduce the change in network frequency by an increase in ambient temperature.

5. A transistor oscillator comprising a transistor whose impedances are affected by the ambient temperature and the energization thereof, said transistor having base, emitter and collector electrodes, a resonator coupled to each of said electrodes at three points respectively placed to facilitate oscillation, a source of energizing potentials, and a frequency compensation circuit comprising an ambient temperature sensitive resistance having a negative temperature coefficient coupled between one terminal of said source and said base electrode and a second resistance coupled between said base electrode and the other terminal of said source, said temperature sensitive resistance adjusting the energization of said semiconductor device to reduce ambient temperature induced changes in oscillator frequency.

6. A transistor oscillator comprising a transistor whose impedances are affected by the ambient temperature and the energization thereof, said transistor having base, emitter and collector electrodes, a resonator coupled to each of said electrodes at three points respectively placed to facilitate oscillation, a source of energizing potentials, said emitter being coupled through a resistance to one terminal of said source, and a frequency compensation circuit comprising an ambient temperature sensitive resistance having a negative temperature coefficient coupled between the other terminal of said source and said base electrode, and a second resistance coupled between the base electrode and said one terminal of said source, said temperature sensitive resistance adjusting the energization of said semiconductor device to reduce ambient temperature induced changes in oscillator frequency.

References Cited in the file of this patent

UNITED STATES PATENTS

| | | |
|---|---|---|
| 2,111,086 | Basim | Mar. 15, 1938 |
| 2,485,919 | Rambo | Oct. 25, 1949 |
| 2,757,243 | Thomas | July 31, 1956 |

OTHER REFERENCES

"Duality as a Guide in Transistor Design," from Bell Telephone System Monograph 1874, vol. 30, pp. 17–18, April 1951.

Article: "Junction Transistor Circuit Application," by Sulzer, Electronics, for August 1953, pp. 170–173.